United States Patent
Zhang et al.

(10) Patent No.: US 9,269,155 B2
(45) Date of Patent: Feb. 23, 2016

(54) REGION GROWING METHOD FOR DEPTH MAP/COLOR IMAGE

(71) Applicant: MediaTek Singapore Pte. Ltd., Singapore (SG)

(72) Inventors: Tao Zhang, Sunnyvale, CA (US); Yu-Pao Tsai, Kaohsiung (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 185 days.

(21) Appl. No.: 13/669,453

(22) Filed: Nov. 6, 2012

(65) Prior Publication Data

US 2013/0266223 A1 Oct. 10, 2013

Related U.S. Application Data

(60) Provisional application No. 61/620,456, filed on Apr. 5, 2012.

(51) Int. Cl.
*G06T 7/00* (2006.01)

(52) U.S. Cl.
CPC ..... *G06T 7/0081* (2013.01); *G06T 2207/10024* (2013.01); *G06T 2207/10028* (2013.01); *G06T 2207/20076* (2013.01); *G06T 2207/20141* (2013.01); *G06T 2207/20144* (2013.01)

(58) Field of Classification Search
CPC .................. G06T 7/0081; G06T 2207/10024
USPC ......................... 382/164, 173, 180
See application file for complete search history.

(56) References Cited

U.S. PATENT DOCUMENTS

| | | | | |
|---|---|---|---|---|
| 5,546,474 A | * | 8/1996 | Zuniga | 382/176 |
| 6,483,940 B1 | * | 11/2002 | Wang | 382/164 |
| 6,704,439 B1 | * | 3/2004 | Lee et al. | 382/131 |
| 6,754,374 B1 | * | 6/2004 | Miller et al. | 382/128 |
| 2002/0048397 A1 | * | 4/2002 | Lloyd-Jones | 382/165 |

(Continued)

FOREIGN PATENT DOCUMENTS

| | | |
|---|---|---|
| CN | 101048798 A | 10/2007 |
| CN | 101882303 A | 11/2010 |
| TW | 201314582 A1 | 4/2013 |

OTHER PUBLICATIONS

Zhu et al. ("Three-dimensional CT image segmentation by volume growing," Proc. SPIE. 1606, Nov. 1, 1991, 685-696)-segmenting slices individually then grouping together to form 3D labeled regions.*

(Continued)

*Primary Examiner* — Yubin Hung
(74) *Attorney, Agent, or Firm* — Winston Hsu; Scott Margo

(57) ABSTRACT

An exemplary region growing method include at least the following steps: selecting a seed point of a current frame as an initial growing point of a region in the current frame; determining a background confidence value at a neighboring pixel around the seed point; and utilizing a processing unit for checking if the neighboring pixel is allowed to be included in the region according to at least the background confidence value.

22 Claims, 13 Drawing Sheets

(56) References Cited

U.S. PATENT DOCUMENTS

| | | | |
|---|---|---|---|
| 2004/0126014 A1* | 7/2004 | Lipton et al. | 382/173 |
| 2005/0259855 A1* | 11/2005 | Dehmeshki | 382/131 |
| 2006/0153450 A1* | 7/2006 | Woodfill et al. | 382/173 |
| 2006/0239552 A1* | 10/2006 | Tu et al. | 382/173 |
| 2007/0081712 A1* | 4/2007 | Huang et al. | 382/128 |
| 2007/0249931 A1* | 10/2007 | Fain et al. | 600/420 |
| 2007/0257910 A1* | 11/2007 | Gutmann et al. | 345/424 |
| 2008/0130948 A1* | 6/2008 | Ozer | 382/103 |
| 2008/0170787 A1* | 7/2008 | Cheng et al. | 382/180 |
| 2008/0187198 A1* | 8/2008 | Grady et al. | 382/128 |
| 2008/0187219 A1* | 8/2008 | Chen et al. | 382/173 |
| 2008/0240496 A1* | 10/2008 | Senior | 382/103 |
| 2009/0087096 A1* | 4/2009 | Eaton et al. | 382/190 |
| 2009/0092302 A1* | 4/2009 | Kubota et al. | 382/128 |
| 2012/0114225 A1* | 5/2012 | Lim et al. | 382/154 |
| 2012/0250933 A1* | 10/2012 | Porikli et al. | 382/100 |
| 2012/0314942 A1* | 12/2012 | Williams et al. | 382/164 |
| 2013/0077842 A1* | 3/2013 | El-Zehiry et al. | 382/131 |

OTHER PUBLICATIONS

Ko et al. ("Efficient segmentation algorithm for 3D medical image data using a region-growing-based tracking technique," Proc. SPIE 3979, Jun. 6, 2000, 880-887).*

Pavlidis, Integrating Region Growing and Edge Detection, pp. 208-214, Computer Vision and Pattern Recognition, 1988.

Hoover, An Experimental Comparison of Range Image Segmentation Algorithms, IEEE Transactions on Pattern Analysis and Machine Intelligence, vol. 18, No. 7, pp. 673-689, Jul. 1996.

Adams, Seeded Region Growing, IEEE Transactions on Pattern Analysis and Machine Intelligence, vol. 16, No. 6, pp. 641-647, Jun. 1994.

Zhu et al., "Three-dimensional CT image segmentation by volume growing", Proc. SPIE vol. 1606, Visual Communications and Image Processing, Nov. 1, 1991, p. 685-696.

* cited by examiner

REGION GROWING METHOD FOR DEPTH MAP/COLOR IMAGE

CROSS REFERENCE TO RELATED APPLICATIONS

This application claims the benefit of U.S. provisional application No. 61/620,456, filed on Apr. 5, 2012 and incorporated herein by reference.

BACKGROUND

The disclosed embodiments of the present invention relate to separating foreground objects from the background, and more particularly, to a region growing method for segmenting an input image (e.g., a depth map or a color image) from unordered pixels into segmented regions with mitigated region chaining.

Depth cameras become popular in recent years in gaming. Detecting and labeling objects (for example, gamers before a depth camera) is an important task which should be done before any further image processing is performed in a computer vision system. When cameras are generally fixed in most cases, objects may be easily separated from the background using background subtraction algorithms. However, background subtraction algorithms may not be able to give perfect separated objects for some frames. For example, due to the possible limitation of background subtraction algorithms, the detected people from depth images may miss parts of a body, such as head, hands or legs. If such incomplete results are fed into later processing stages, the performance may be adversely affected. Before passing these possible incomplete objects to later processing stages, a conventional region growing algorithm may be performed to recover the missing parts.

Region growing is a commonly used technique to segment images from unordered pixels into segmented regions. Conventional region growing methods have been extensively used in both intensity images and range (depth) images. Roughly, the usage of region growing may be divided into two scenarios. One is to segment a whole image into different regions; the other is to segment some objects out of the whole image while leaving the remaining image intact. However, conventional region growing methods suffer from the problem of region chaining (overspill). Region chaining occurs when two regions are grown into one region while they are actually separated from each other.

Region growing was also extensively used in the range image segmentation. However, the main objective of range image segmentation is to label pixels into different surfaces. For most cases, some surfaces are planar, while other surfaces may be curved surfaces. If the object in consideration cannot be represented by those pre-determined surfaces, the segmentation result will not be satisfactory. Besides, region growing used in the range image segmentation is computationally intensive, and cannot separate two surfaces on a same plane joined at edges.

With the introduction of relative cheap depth cameras, image analysis in depth image is becoming popular. For many applications, segmentation of objects is an important step and may be effectively achieved by region growing from seeded regions. Thus, there is a need for an innovative region growing algorithm which is capable of effectively growing regions from seeds without region chaining.

SUMMARY

In accordance with exemplary embodiments of the present invention, a region growing method for segmenting an input image (e.g., a depth map or a color image) from unordered pixels into segmented regions without region chaining is proposed to solve the above-mentioned problem.

According to a first aspect of the present invention, an exemplary region growing method is disclosed. The exemplary region growing method includes at least the following steps: selecting a seed point of a current frame as an initial growing point of a region in the current frame; determining a background confidence value at a neighboring pixel around the seed point; and utilizing a processing unit for checking if the neighboring pixel is allowed to be included in the region according to at least the background confidence value.

According to a second aspect of the present invention, an exemplary region growing method is disclosed. The exemplary region growing method includes at least the following steps: selecting a seed point of a current frame as an initial growing point of a region in the current frame; determining a first difference value between a characteristic value of the seed point and a characteristic value of a neighboring pixel around the seed point in the current frame; and utilizing a processing unit for checking if the neighboring pixel is allowed to be included in the region according to at least the first difference value.

According to a third aspect of the present invention, an exemplary region growing method is disclosed. The exemplary region growing method includes at least the following steps: selecting a seed point of a current frame as an initial growing point of a region in the current frame; determining a first difference value between a characteristic value of a neighboring pixel around the seed point in the current frame and a background model value of an original seed point of the seed point; and utilizing a processing unit for checking if the neighboring pixel is allowed to be included in the region according to at least the first difference value.

According to a fourth aspect of the present invention, an exemplary region growing method is disclosed. The exemplary region growing method includes at least the following steps: selecting a seed point of a current frame as an initial growing point of a region; when a specific pixel in a previous frame is classified as a foreground pixel, determining a difference value between a characteristic value of a neighboring pixel around the seed point in the current frame and a characteristic value of the specific pixel in the previous frame, wherein the neighboring pixel and the specific pixel are co-located pixels; and utilizing a processing unit for checking if the neighboring pixel is allowed to be included in the region according to at least the difference value.

According to a fifth aspect of the present invention, an exemplary region growing method is disclosed. The exemplary region growing method includes at least the following steps: selecting a seed point of a current frame as an initial growing point of a region; checking if a neighboring pixel around the seed point in the current frame is allowed to be included in the region; when the neighboring pixel in the current frame is classified as a background pixel in response to the checking step and a specific pixel in a previous frame is classified as a foreground pixel, determining a difference value between a characteristic value of the neighboring pixel and a characteristic value of the specific pixel, wherein the neighboring pixel and the specific pixel are co-located pixels; and utilizing a processing unit for selectively reclassifying the neighboring pixel as a foreground pixel according to the second difference value.

According to a sixth aspect of the present invention, an exemplary region growing method is disclosed. The exemplary region growing method includes at least the following steps: selecting a seed point of a current frame as an initial growing point of a region; utilizing a processing unit for referring to a planar surface detection result to check if a neighboring pixel belongs to a detected planar surface, and accordingly generating a checking result, wherein the neighboring pixel is around the seed point in the current frame; when the checking result indicates that the neighboring pixel belongs to the detected planar surface, blocking the neighboring pixel from being included in the region; and when the checking result indicates that the neighboring pixel does not belong to the detected planar surface, checking if the neighboring pixel is allowed to be included in the region.

According to a seventh aspect of the present invention, an exemplary region growing method with labeling is disclosed. The exemplary region growing method with labeling includes at least the following steps: selecting a seed point of a current frame as an initial growing point of a region; utilizing a processing unit for determining a difference value between a characteristic value of the seed point in the current frame and a characteristic value of a specific point in a previous frame, and determining a label assigned to the seed point according to the difference value, wherein the seed point and the specific point are co-located points; checking if a neighboring pixel around the seed point in the current frame is allowed to be included in the region; and when the neighboring pixel is allowed to be included in the region in response to the checking step, setting a label of the neighboring pixel by the label assigned to the seed point.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Generally, the objects to be identified in a scene move around, while the background is fixed. Hence, background modeling and background subtraction may be used to identify a moving object. However, in some cases, the identified object may not be a complete object. For example, a head of a moving person is detected, but most parts of the body are not detected. Passing such incomplete objects to later processing stages may lead to many kinds of errors such as failed recognition and tracking. A region growing step may be performed on the detected parts to recover those undetected parts of an object. However, without careful consideration, it is very easy to include unwanted regions in the region growing step. For example, for the case that a person stands on a floor and only the upper body of the person is detected, if a conventional seeded region growing method is applied directly on detected parts of the person, most likely, the final recovered object will include both the person and some parts of the floor. The invention proposes an improved region growing method which can mitigate/avoid the region chaining problem. Specifically, the proposed region growing method uses the popular framework of seeded region growing (which segments some objects out of the whole image while leaving the remaining image intact) with new/modified steps included therein to handle region chaining. Some observations which lead to the proposed region growing method capable of overcoming the region chaining problem are discussed as below.

Figure 1:
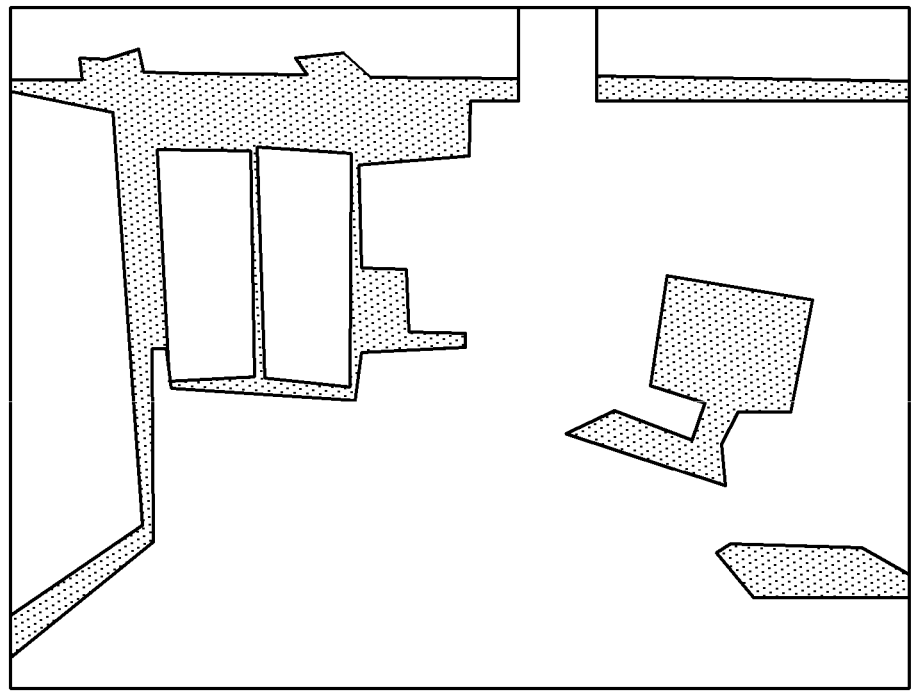
FIG. 1 is a diagram illustrating an exemplary distribution of background confidence values obtained in the background modeling stage.

The first observation is that the background is fixed for many frames. Hence, the background is mostly unchanged, and will be blocked by moving objects temporarily. The background modeling stage is used to build a background model, and also estimate background confidence values for all pixels based on background model values of the built background model. Specifically, each pixel belonging to the background would have a high background confidence value, thus showing high background confidence. FIG. 1 is a diagram illustrating an exemplary distribution of background confidence values obtained in the background modeling stage. As can be seen from FIG. 1, pixels in the dark regions have lower background confidence values, while pixels in the bright regions have higher background confidence values. Hence, the background confidence value distribution indicates that the bright regions have high confidence to be part of the background. In the region growing stage, if a pixel has a high background confidence value, it means that it is more likely to be a background pixel and the region should stop growing to that pixel. In other words, if it is confident that a pixel is a background pixel, this pixel may be ignored by the region growing step instead of being merged into a seeded region.

Figure 2:
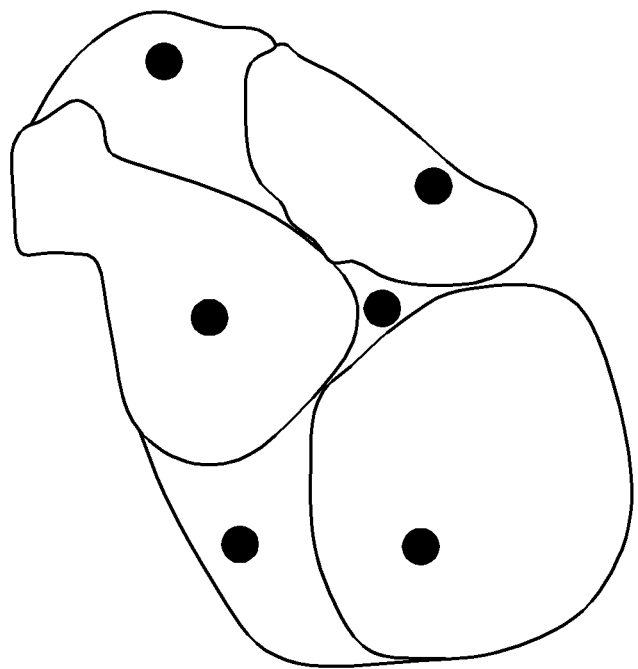
FIG. 2 is a diagram illustrating an exemplary region growing result generated from the region growing stage with growing range restrictions applied thereto.

The second observation is that, for many cases, especially in depth images, an object may not grow to a very large region away from a seed point, even an object can grow to a very large region from multiple seed points. For a depth image, it means that an object in interest may extend only in a relatively small range in depth with reference to depth of a seed point. If some restrictions are employed to define how far in depth a region may grow away from the seed point, the undesired region chaining may be mitigated/avoided. FIG. 2 is a diagram illustrating an exemplary region growing result generated from the region growing stage with growing range restrictions applied thereto. It should be noted that there are many seed points represented by black dots in FIG. 2. Even though some restrictions are employed to define how far in depth a region may grow away from a seed point, the region growing stage may still fully recover missing parts while avoiding/mitigating the undesired region chaining. Specifically, the performance depends on how many seed points selected.

Figure 3:
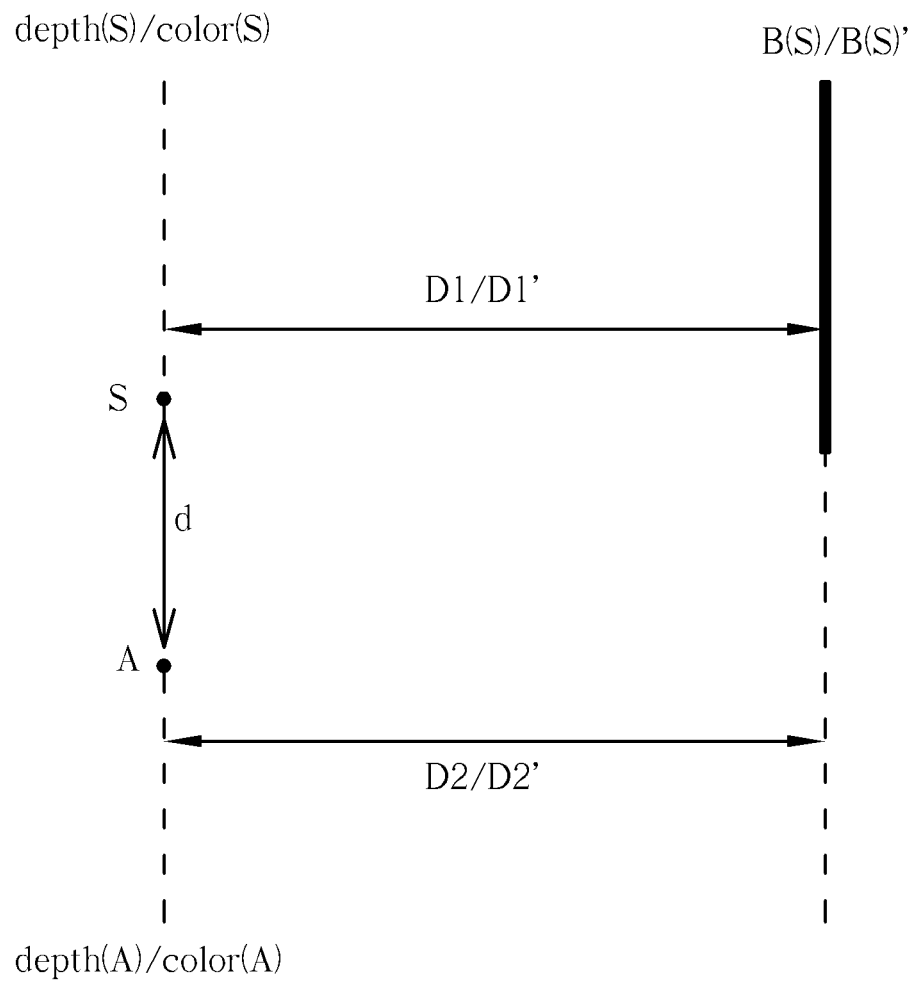
FIG. 3 is a diagram illustrating the relationship between a seed point and a neighboring pixel.

The third observation assumes that a background model is used to detect objects. FIG. 3 is a diagram illustrating the relationship between a seed point S and a neighboring pixel A. Similar to the second observation mentioned above, if the point A is not far away from the foreground seed point S, the background model value at point A is very likely to be close to the background model value at point S. In a case where the region growing method is for processing a depth map, since point S is a foreground seed point, the difference (i.e., depth distance) D1 between its depth value depth(S) and its background model value (i.e., a depth background value) B(S) is large. In another case where the region growing method is for processing a color image (i.e., an RGB image), since point S is a foreground seed point, the difference (i.e., color distance) D1' between its color value color(S) and its background model value (i.e., a color background value) B'(S) is large. If point A is a foreground pixel and is not far away from the seed point S based on the second observation (i.e., the distance d between A and S is small), it is thus likely that the difference D2 between its depth value depth(A) and the background model value B(S) at point S (or the difference D2' between its color value color(A) and the background model value B'(S) at point S) is large too. Hence, if the difference D2/D2' is small instead, it is very likely that point A is a background pixel instead of a foreground pixel. Therefore, the difference D2/D2' between the depth value/color value of a pixel A and the background model value of the seed point S may be used as an indicator to stop region chaining. That is, when the difference D2/D2' indicates that the pixel A is highly likely a background pixel, the region is stopped from growing to this pixel. In practice, this observation is very helpful to prevent overspill of body parts (e.g., feet) to grow into floors.

Note that the second observation and the third observation mentioned above do not hold true for all cases. However, they do curb the region chaining problem well in practice. The first three observations mainly deal with region chaining problems, and they are generally controlled by some thresholds. If thresholds are too loose, some unwanted region may still be included; if thresholds are too tight, some wanted regions will be excluded. In practice, tight thresholds are better than loose thresholds since it is relatively easier to recover lost regions than to remove regions.

Figure 4:
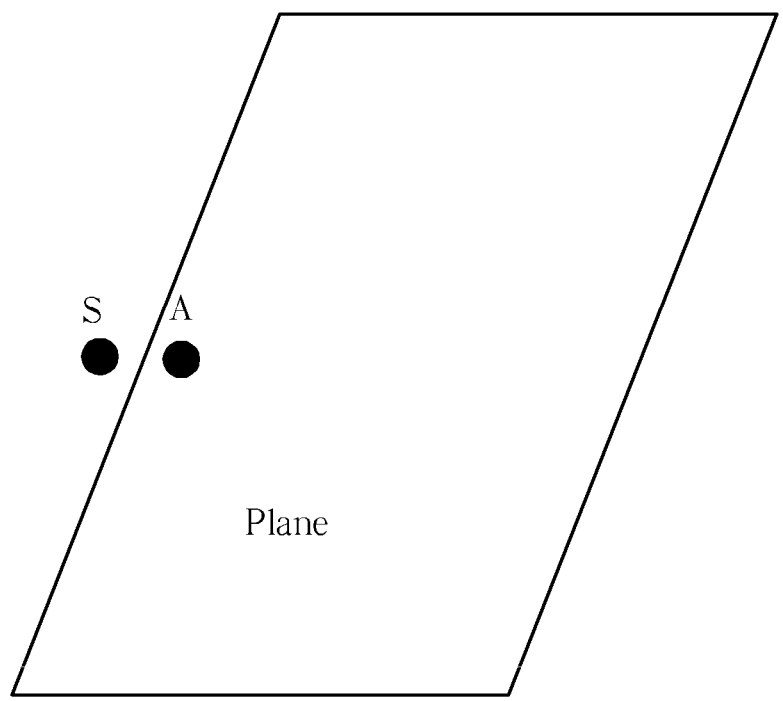
FIG. 4 is a diagram illustrating another relationship between a seed point and a neighboring pixel.

The fourth observation is that planar surfaces such as walls and floors often exist in the scene, and the planar surfaces are typically the background. The region chaining problem often happens when parts of these surfaces are included in the region growing result. If these planar surfaces can be detected beforehand, it will help to prevent a region from growing into these planar surfaces. FIG. 4 is a diagram illustrating another relationship between a seed point S and a neighboring pixel A. As can be seen from FIG. 4, the point A lies on a plane which is part of the background. Even though point A and seed point S are very close to each other, the background point A should be excluded from a region which grows from the seed point S.

Based on above observations, several region growing algorithms are proposed by the present invention, as below.

Figure 5:
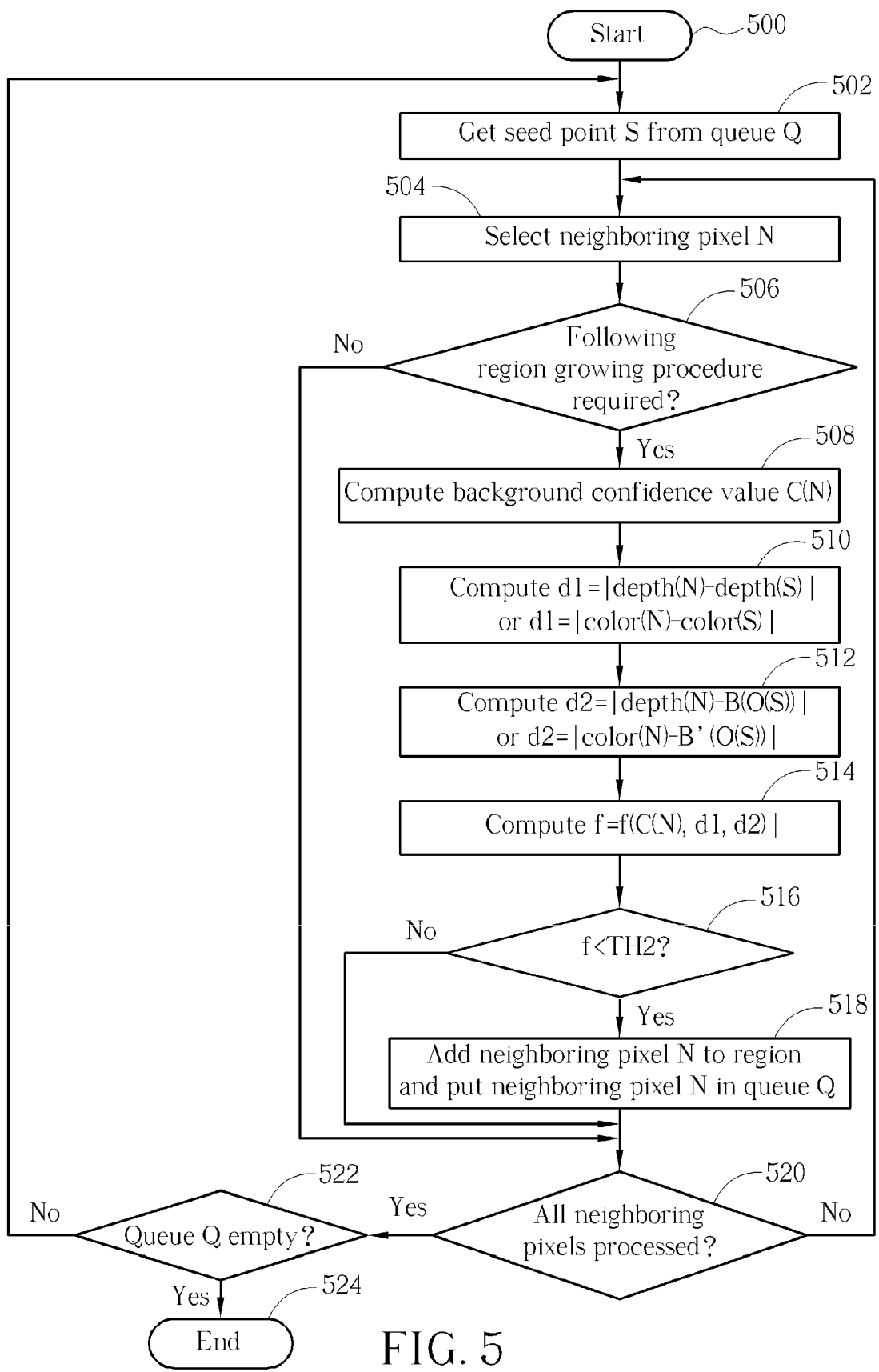
FIG. 5 is a flowchart illustrating a region growing method according to an embodiment of the present invention.

Please refer to FIG. 5, which is a flowchart illustrating a region growing method according to an embodiment of the present invention. If the result is substantially the same, the steps are not required to be executed in the exact order shown in FIG. 5. The exemplary region growing method may be briefly summarized as below.

Step 500: Start.

Step 502: Get a seed point S from a queue Q.

Step 504: Select a neighboring pixel N around the selected seed point S, where the neighboring pixel N and the seed point S are both located in the same frame.

Step 506: Check if the neighboring pixel N should undergo the following region growing procedure. If yes, go to step 508; otherwise, go to step 520.

Step 508: Determine/compute a background confidence value C(N) at the neighboring pixel N.

Step 510: Determine/compute a difference value d1 between a characteristic value of the neighboring pixel N and a characteristic value of the seed point S, wherein each characteristic value is a depth value when the region growing is applied to a depth map; alternatively, each characteristic value is a color value when the region growing is applied to a color image (e.g., an RGB image). That is, d1=|depth(N)−depth(S)|, or d1=|color(N)−color(S)|.

Step 512: Determine/compute a difference value d2 between the characteristic value of the neighboring pixel N and a background model value of an original seed point O(S) of the seed point S. That is, d2=|depth(N)−B(O(S))| when the region growing is applied to a depth map. Alternatively, d2=|color(N)−B'(O(S))| when the region growing is applied to a color image.

Step 514: Refer to a function f( ) to determine/compute a combined value f. That is, f=f(C(N), d1, d2), where C(N), d1 and d2 are parameters of the function f( ).

Step 516: Check if the combined value f is smaller than a predetermined threshold TH2 by comparing the combined value f with the predetermined threshold TH2. If yes, go to step 518; otherwise, go to step 520.

Step 518: Determine that the neighboring pixel N should be included in the region which grows from the seed point S, and add the neighboring pixel N to the region and put the neighboring pixel N in the queue Q to act as a new seed point, where the original seed point of the newly added seed point (i.e., the neighboring pixel N) is O(S).

Step 520: Check if all neighboring pixels of the selected seed point S have been processed. If yes, go to step 522; otherwise, go to step 504 to select another neighboring pixel around the seed point S.

Step 522: Check if the queue Q is empty. If yes, go to step 524; otherwise, go to step 502 to get the next seed point from the queue Q.

Step 524: End.

In the beginning of the region growing applied to a current frame, a plurality of original seed points of the current frame are put into a queue Q, where the original seed points will be selected one by one from the queue Q each time step 502 is executed. In step 502, one seed point S is obtained from the queue Q. It should be noted that the seed point S obtained in step 502 would be an original seed point before all the original seed points in the queue Q have been selected and removed from the queue Q sequentially. In other words, after the queue Q has no original seed point included therein, any seed point S obtained in step 502 would be a foreground pixel which is identified and merged into a region growing from one of the original seed points and then added to the queue Q to act as a new seed point.

In step 504, one neighboring pixel N around the seed point S is selected. For example, a pixel which is close to the seed point S and is not processed yet may be selected as the neighboring pixel N. Next, the flow would check if the neighboring pixel N should undergo the following region growing procedure. In one exemplary design, a simple comparison between the neighboring pixel N and the seed point S may be employed. For example, the depth/color difference value d1 (i.e., d1=|depth(N)−depth(S)| or d1=|color(N)−color(S)|) may be compared with a predetermined threshold TH1. Alternatively, other more complicated comparison may be employed in step 506, depending upon actual design consideration.

Assume that the simple comparison is employed by step 506. When the depth/color difference value d1 is found larger than the predetermined threshold TH1, it implies that the neighboring pixel N is not a foreground pixel similar with the seed point S, and cannot be included in the region growing from the seed point S. Hence, the neighboring pixel N is discarded such that the following region growing procedure is skipped and the flow directly proceeds with step 520.

However, when the depth/color difference value d1 is not larger than the predetermined threshold TH1, it implies that the neighboring pixel N may be a foreground pixel similar with the seed point S, and may be required to be included in the region growing from the seed point S. However, to avoid/mitigate the region chaining problem, the following region growing procedure, including steps 508-516, for checking if the neighboring pixel N is allowed to be included in the region is executed.

Based on the first observation mentioned above, the background confidence value C(N) at the neighboring pixel N is obtained in step 508. As mentioned above, the background confidence may be constructed in the background modeling stage. There are many possible ways to construct the background confidence values. One of the possible methods to build a background confidence value at a current pixel is to compute a value as follows:

Background confidence=(# of current depth as background−# of non-meaningful)/# of current pixel as background.

An alternative way for background confidence estimation is to build a scene, such as all surfaces in the scene are detected first, and then high background confidence values may be assigned to pixels on these surfaces.

In addition, based on the second observation mentioned above, the difference value d1 is computed in step 510. Further, based on the third observation mentioned above, the difference value d2 is computed in step 512. These difference values d1 and d2 provide additional information which is helpful to prevent the region chaining.

After C(N), d1 and d2 are obtained, the combined value f is computed correspondingly. By way of example, but not limitation, the function f( ) may be simply implemented using a weighted average function for generating the combined value f by applying weighting factors W1, W2, W3 to the input parameters (i.e., C(N), d1 and d2). In other words, f=W1*C(N)+W2*c11+W3*c12. It should be noted that one or more of the aforementioned observations may be employed for region chaining/overspill check. That is, each of the weighting factors W1, W2, W3 may be set by a zero value or a non-zero value, depending upon actual design consideration. For example, when all of the weighting factors W1, W2, W3 are set to zero, no region chaining/overspill check is used. When the weighting factor W1 is set to zero, the region chaining/overspill check is performed without the first observation taken into consideration. When the weighting factor W2 is set to zero, the region chaining/overspill check is performed without the second observation taken into consideration. When the weighting factor W3 is set to zero, the region chaining/overspill check is performed without the third observation taken into consideration.

Next, the region chaining/overspill check is accomplished by comparing the combined value f with the predetermined threshold TH2 (step 516). When the combined value f is smaller than the predetermined threshold TH2, this implies that the neighboring pixel N passes the region chaining/overspill check and should be merged into the region growing from the seed point S. Hence, in step 518, the neighboring pixel N is added to the region and put in the queue Q to act as a new seed point. It should be noted that the original seed point of the newly added seed point (i.e., the neighboring pixel N) is identical to the original seed point O(S) of the seed point S. That is, since the neighboring pixel N and the seed point S are merged in the same region, the original seed point of the neighboring pixel N is inherited from the original seed point of the seed point S. Please note that if the seed point S is an original seed point, the original seed point O(S) would be identical to the seed point S.

When step 520 is executed, it is used to check if the region growing for the currently selected seed point S is finished. Specifically, if all neighboring pixels of the selected seed point S have been processed, a final region growing from the seed point S is obtained. Hence, the flow would go to step 522. However, if there is at least one neighboring pixel of the selected seed point S that is not processed yet, the flow would go to step 504 to keep processing the next neighboring pixel of the selected seed point S.

When step 522 is executed, it is used to check if the region growing for the current frame is finished. Specifically, if all seed points in the queue Q have been processed to make the queue Q become empty, the region growing for the current frame is ended (step 524). However, if there is at least one seed point remaining in the queue Q, the flow would go to step 502 to keep processing the next seed point obtained from the queue Q.

The region growing method shown in FIG. 5 is capable of effectively overcoming the region chaining problem. Since perfect thresholds are difficult to determine, tight thresholds are preferred to be used to curb the region chaining problem, but may leave holes (i.e., missing parts) in the final objects decided by the identified regions. However, the holes may be eliminated by using information derived from the previous frame. Thus, a fifth observation of the present invention is that if a pixel A belongs to a foreground object in a previous frame, and the feature difference (e.g., the depth difference or the color difference) of the same pixel A between the previous frame and the current frame is small, the pixel A would most likely belong to a foreground object in the current frame. With additional information given from the previous frame, some modified region growing methods based on the region growing method shown in FIG. 5 are also proposed by the present invention.

Figure 6:
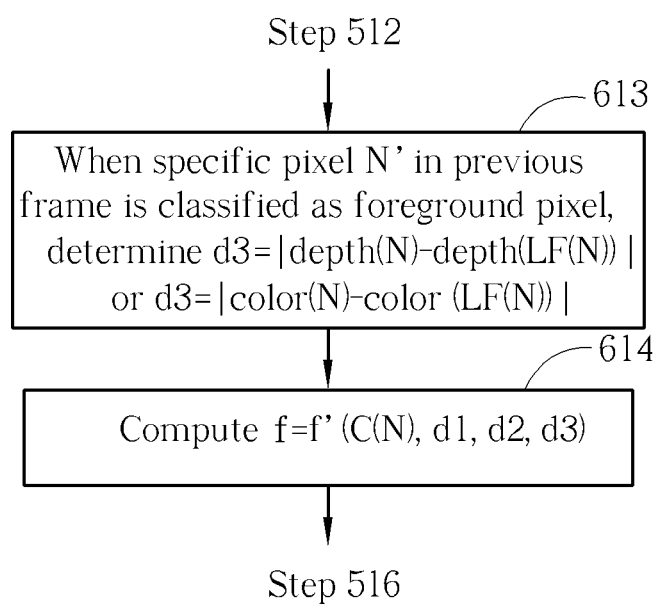
FIG. 6 is a flowchart illustrating the difference between a modified region growing method and the region growing method shown in FIG. 5 according to an embodiment of the present invention.

Please refer to FIG. 6, which is a flowchart illustrating the difference between a modified region growing method and the region growing method shown in FIG. 5 according to an embodiment of the present invention. The major difference between the modified region growing method and the region growing method shown in FIG. 5 is that the modified region growing method has an additional step 613 following the step 512 shown in FIG. 5 and a step 614 replacing the step 514 shown in FIG. 5. It should be noted that the modified region growing method has the same steps 500-512 and 516-524 shown in FIG. 5, which are not shown in FIG. 6 for brevity. The steps 613 and 614 are as below.

Step 613: When a specific pixel LF(N) in a previous frame is classified as a foreground pixel, determine a difference value d3 between a characteristic value of the neighboring pixel N in the current frame and a characteristic value of the specific pixel LF(N) in the previous frame, wherein the neighboring pixel N and the specific pixel LF(N) are co-located pixels. For example, d3=|depth(N)−depth(LF(N))|, or d3=|color(N)−color (LF(N))|.

Step 614: Refer to a function f'( ) to determine/compute a combined value f. That is, f=f'(C(N), d1, d2, d3), where C(N), d1, d2 and d3 are parameters of the function f'( ).

By way of example, but not limitation, the function f'( ) may be simply implemented using a weighted average function for generating the combined value f by applying weighting factors W1, W2, W3, W4 to the input parameters (i.e., C(N), d1, d2 and d3). In other words, f=W1*C(N)+W2*d1+W3*d2+W4*d3. It should be noted that one or more of the aforementioned observations may be employed for region chaining/overspill check. That is, each of the weighting factors W1, W2, W3, W4 may be set by a zero value or a non-zero value, depending upon actual design consideration. For example, when all of the weighting factors W1, W2, W3, W4 are set to zero, no region chaining/overspill check is used. When the weighting factor W1 is set to zero, the region chaining/overspill check is performed without the first observation taken into consideration. When the weighting factor W2 is set to zero, the region chaining/overspill check is performed without the second observation taken into consideration. When the weighting factor W3 is set to zero, the region chaining/overspill check is performed without the third observation taken into consideration. When the weighting factor W4 is set to zero, the region chaining/overspill check is performed without the fifth observation taken into consideration.

Figure 7:
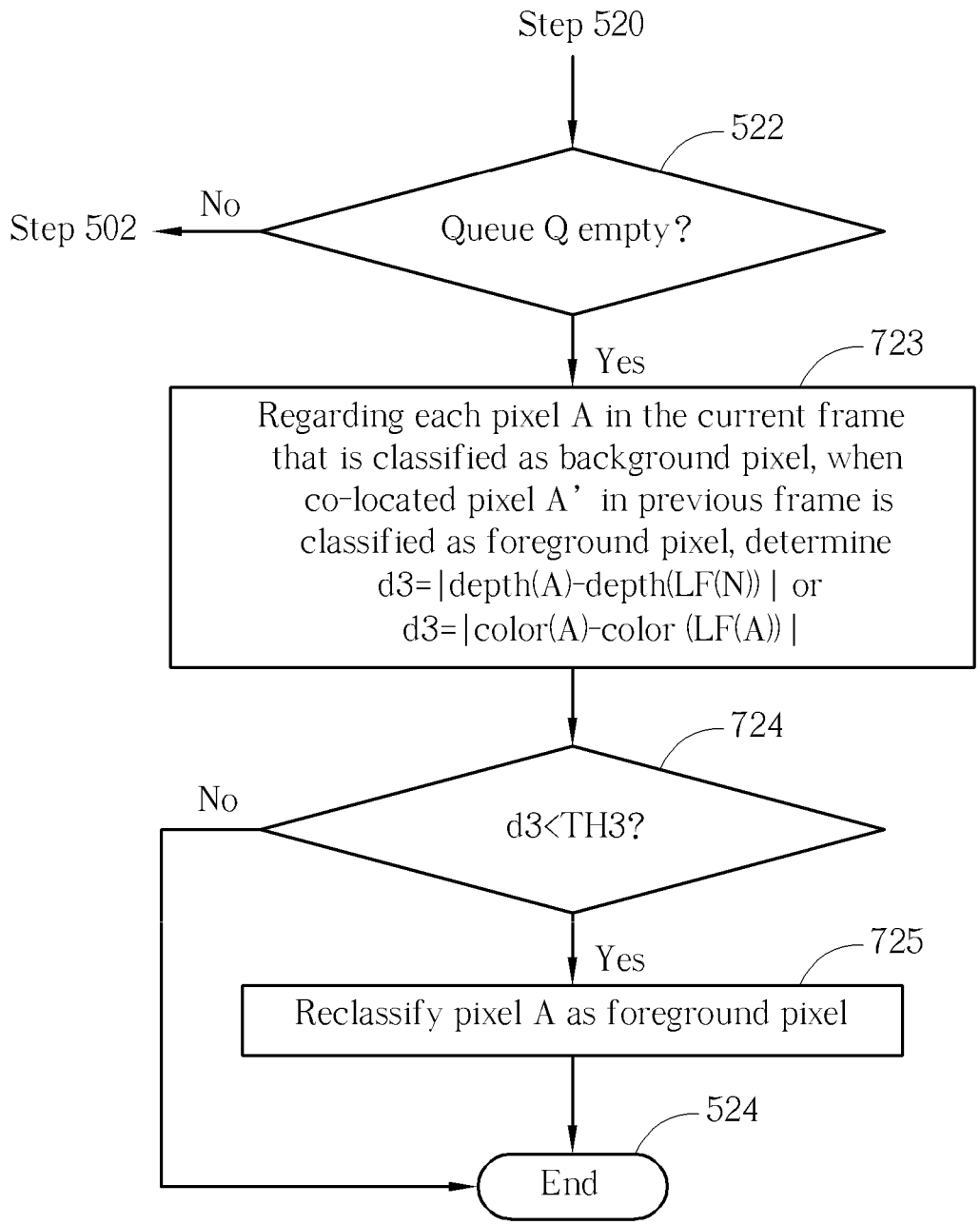
FIG. 7 is a flowchart illustrating the difference between another modified region growing method and the region growing method shown in FIG. 5 according to an embodiment of the present invention.

Please refer to FIG. 7, which is a flowchart illustrating the difference between another modified region growing method and the region growing method shown in FIG. 5 according to an embodiment of the present invention. The major difference between the modified region growing method and the region growing method shown in FIG. 5 is that the modified region growing method has additional steps 723-725 inserted between steps 522 and 524 shown in FIG. 5. It should be noted that the modified region growing method also has the same steps 500-520 shown in FIG. 5, which are not shown in FIG. 7 for brevity. The steps 723-725 are as below.

Step 723: Regarding each pixel A in the current frame that is classified as a background pixel, when a co-located pixel LF(A) in a previous frame is classified as a foreground pixel, determine a difference value d3 between a characteristic value of the pixel A and a characteristic value of the co-located pixel LF(A). For example, d3=|depth(A)−depth(LF(A))| or d3=|color(A)−color (LF(A))|.

Step 724: Check if the difference value d3 is smaller than a predetermined threshold TH3 by comparing the difference value d3 with the predetermined threshold TH3. If yes, go to step 725; otherwise, go to step 524.

Step 725: Reclassify the pixel A in the current frame as a foreground pixel.

After the region growing of the current frame is finished (step 522), additional steps 723-725 in FIG. 7 are executed to recover possible missing parts by referring to foreground pixels classified in the previous frame. That is, based on the fifth observation, any pixel erroneously classified as a background pixel in the current frame would be reclassified as a foreground pixel when the feature difference (e.g., depth difference or color difference) of co-located pixels A and LF(A) in successive frames is small. However, regarding the modified region growing method with steps 723-725 included therein, the memory cost and computation cost increase a lot due to the keeping of information of the previous frame and the checking of all pixels in foreground objects of the previous frame. Thus, compared to the modified region growing method shown in FIG. 7, the modified region growing method shown in FIG. 6 would be cost-efficient due to the fact that the information of each pixel in the previous frame is used during the region growing procedure applied to each pixel of the current frame. Specifically, there is no need to maintain information of the previous frame.

In addition to one or more of the aforementioned first, second, third and fifth observations, additional observations (e.g., the fourth observation) may be taken into consideration to overcome the region chaining problem. As mentioned above, the fourth observation is that planar surfaces often exist in the scene, where the planar surfaces are typically the background. If the planar surfaces (e.g., floors) are detected beforehand, the planar surface detection result may be used to quickly distinguish between foreground pixels and background pixels in a frame, thus improving the region growing efficiency. Please refer to FIG. 8, which is a flowchart illustrating a floor detection method according to an embodiment of the present invention. The floor detection of each frame is carried out before any further processing is applied to the frame, and may include following steps.

Step 800: Start.

Step 802: Randomly select a pixel group including m pixels (m>=3), and then calculate its norm n.

Step 804: Check if the angle between the normal vector of the expected floor and the norm n is close to 90 degrees by comparing a difference value d4 with a predetermined threshold TH4 (e.g., 5 degrees). If the difference value d4 is smaller than the predetermined threshold TH4, it is almost perpendicular to the floor, and is a candidate for a floor. Thus, the floor detection proceeds with step 806. However, if the difference value d4 is not smaller than the predetermined threshold TH4, it is not a candidate for a floor and is discarded directly. Thus, the floor detection proceeds with step 802 to select another pixel group.

Step 806: Regarding the candidate floor, test neighboring pixels and add them to the candidate floor if they belongs to the candidate floor. The floor norm may be recalculated after pixels are added to the candidate floor.

Step 808: Check if the total number of pixels in the candidate floor is larger than a predetermined threshold TH5. It yes, go to step 810; otherwise, go to step 802 to select another pixel group.

Step 810: Identify all remaining pixels on the identified floor plane and label them for later use. Next, the floor detection proceeds with step 802 to select another pixel group.

Figure 8:
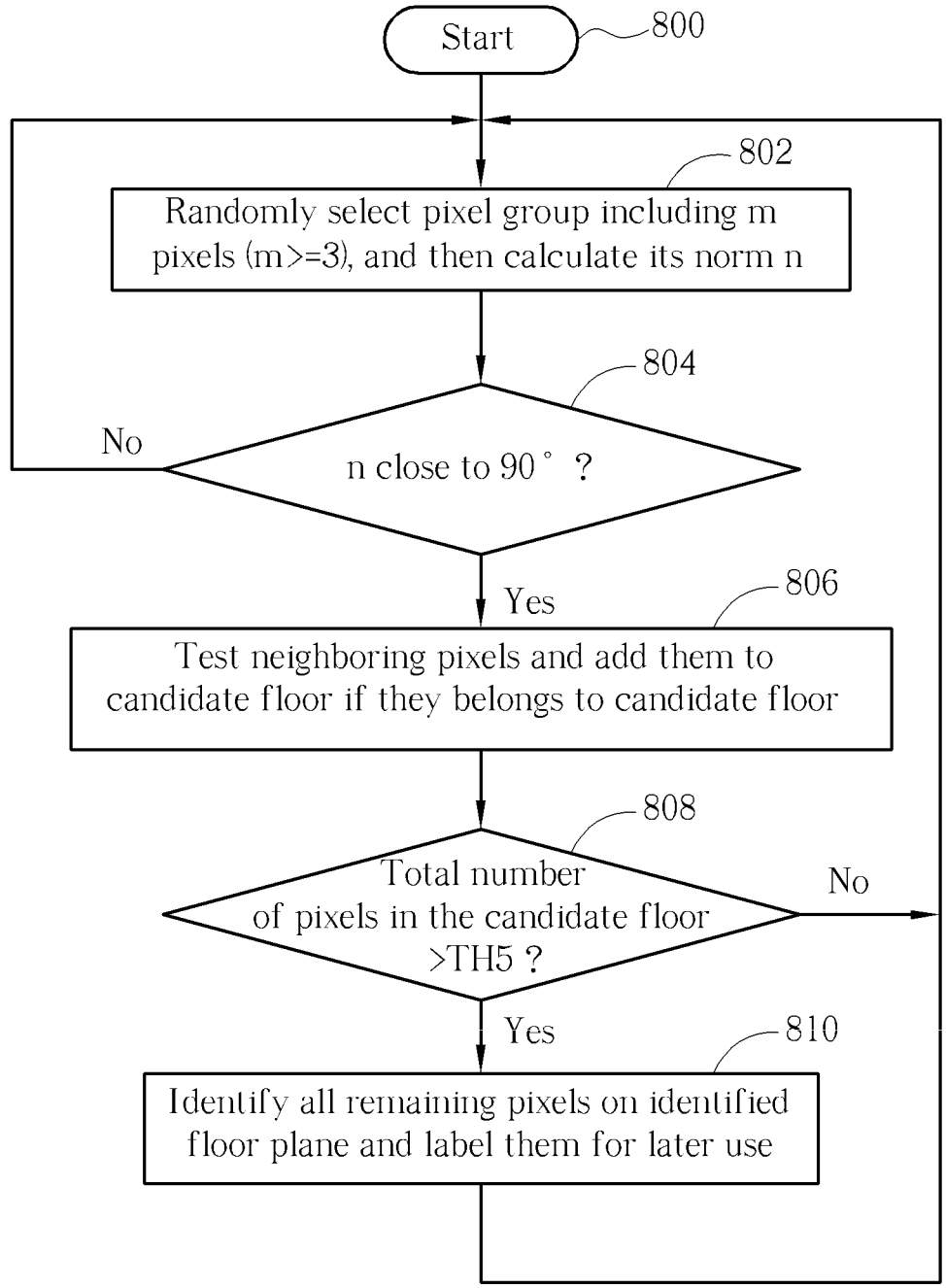
FIG. 8 is a flowchart illustrating a floor detection method according to an embodiment of the present invention.

It should be noted that the floor detection method shown in FIG. 8 is for illustrative purposes only. In practice, any conventional floor detection algorithm may be employed for providing each frame's planar surface information used by the following region growing stage proposed by the present invention.

Figure 9:
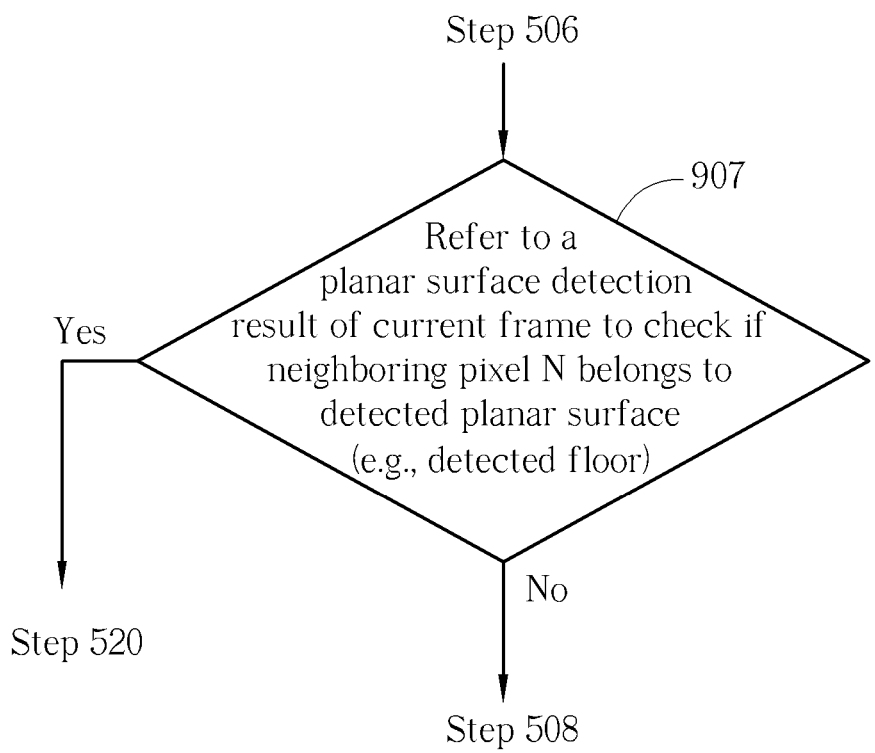
FIG. 9 is a flowchart illustrating the difference between another modified region growing method and the region growing method shown in FIG. 5 according to an embodiment of the present invention.

Please refer to FIG. 9, which is a flowchart illustrating the difference between another modified region growing method and the region growing method shown in FIG. 5 according to an embodiment of the present invention. The major difference between the modified region growing method and the region growing method shown in FIG. 5 is that the modified region growing method has an additional step 907 inserted between steps 506 and 508 shown in FIG. 5. It should be noted that the modified region growing method also has the same steps 500-524 shown in FIG. 5, which are not shown in FIG. 9 for brevity. The step 907 is as below.

Step 907: Refer to a planar surface detection result (e.g., a floor detection result) of the current frame to check if the neighboring pixel N belongs to a detected planar surface (e.g., a detected floor). If yes, go to step 520; otherwise, go to step 508.

To put it simply, based on the fourth observation, the neighboring pixel N is blocked from being included in a region growing from the seed point S when the checking result of step 907 indicates that the neighboring pixel N belongs to the background planar surface. In this way, the region is prevented from growing into these planar surface areas. For example, with the help of the introduced step 907, the region of human body parts like feet may be prevented from growing into the floors. The accuracy of the region growing result is improved accordingly.

It is possible that a pixel A of a current frame is initially classified as a background pixel by the background modeling stage, but the following region growing stage reclaims the pixel A as a foreground pixel. This suggests that the background model at pixel A is not reliable. Based on such an observation, the present invention further proposes giving a feedback to the background modelling stage to indicate that the background model at pixel A is not reliable. Hence, a co-located pixel in the next frame may be correctly classified as a foreground pixel such that the region growing stage does not need to recover it. In this way, the region growing stage can get better results without requiring more computational resources. Please refer to FIG. 10, which is a flowchart illustrating the difference between another modified region growing method and the region growing method shown in FIG. 5 according to an embodiment of the present invention. The major difference between the modified region growing method and the region growing method shown in FIG. 5 is that the modified region growing method has additional steps 1018 and 1019 inserted between steps 518 and 520. It should be noted that the modified region growing method has the same steps 500-524 shown in FIG. 5, which are not shown in FIG. 10 for brevity. The steps 1018 and 1019 are as below.

Step 1018: Check if the neighboring pixel N is classified as a foreground pixel from a background pixel. If yes, go to step 1019; otherwise, go to step 1020.

Step 1019: Send a positive feedback with a first logic value (e.g., 1) to the background modeling stage to indicate that a background model value at the neighboring pixel N is unreliable.

Step 1020: Send a negative feedback with a second logic value (e.g., 0) to the background modeling stage to indicate that a background model value at the neighboring pixel N is reliable.

Therefore, based on the feedback information given from the region growing stage, the background modeling stage will know that the background model at the neighboring pixel N currently processed by the region growing stage is unreliable. Hence, the background modeling stage as well as the background subtraction stage can be configured to perform proper operations to get correct region growing result from the next frame. That is, to obtain the correct region growing result from the next frame, cooperation among different image processing stages, including the region growing stage, the background modeling stage, and the background subtraction stage, is needed. Further description is detailed as below.

Regarding the region growing stage, if a pixel A is misclassified as a background pixel, but the region growing algorithm recovers it as a foreground pixel, the region growing stage sends a positive feedback to instruct the background modeling stage to label the corresponding background model at pixel A as a unreliable one.

Regarding the background modeling stage, if the positive feedback generated from the region growing stage indicates that the background model at pixel A is unreliable, the background modeling stage would check if the background model value at pixel A can be updated to a larger value. It should be noted that if the background model value is large, a corresponding pixel is more likely a background pixel. Hence, if updating the background model value at pixel A to a larger value is allowable, the background modeling stage would perform background model value updating as usual, and the background model value at pixel A labeled as a unreliable one will be reset to a reliable one. Otherwise, no change is made, meaning that the background model value at pixel A remains labeled as unreliable.

Regarding the background subtraction stage following the background modeling stage, if the background model value at pixel A is unreliable, the background subtraction stage would classify it as a foreground pixel.

Figure 11:
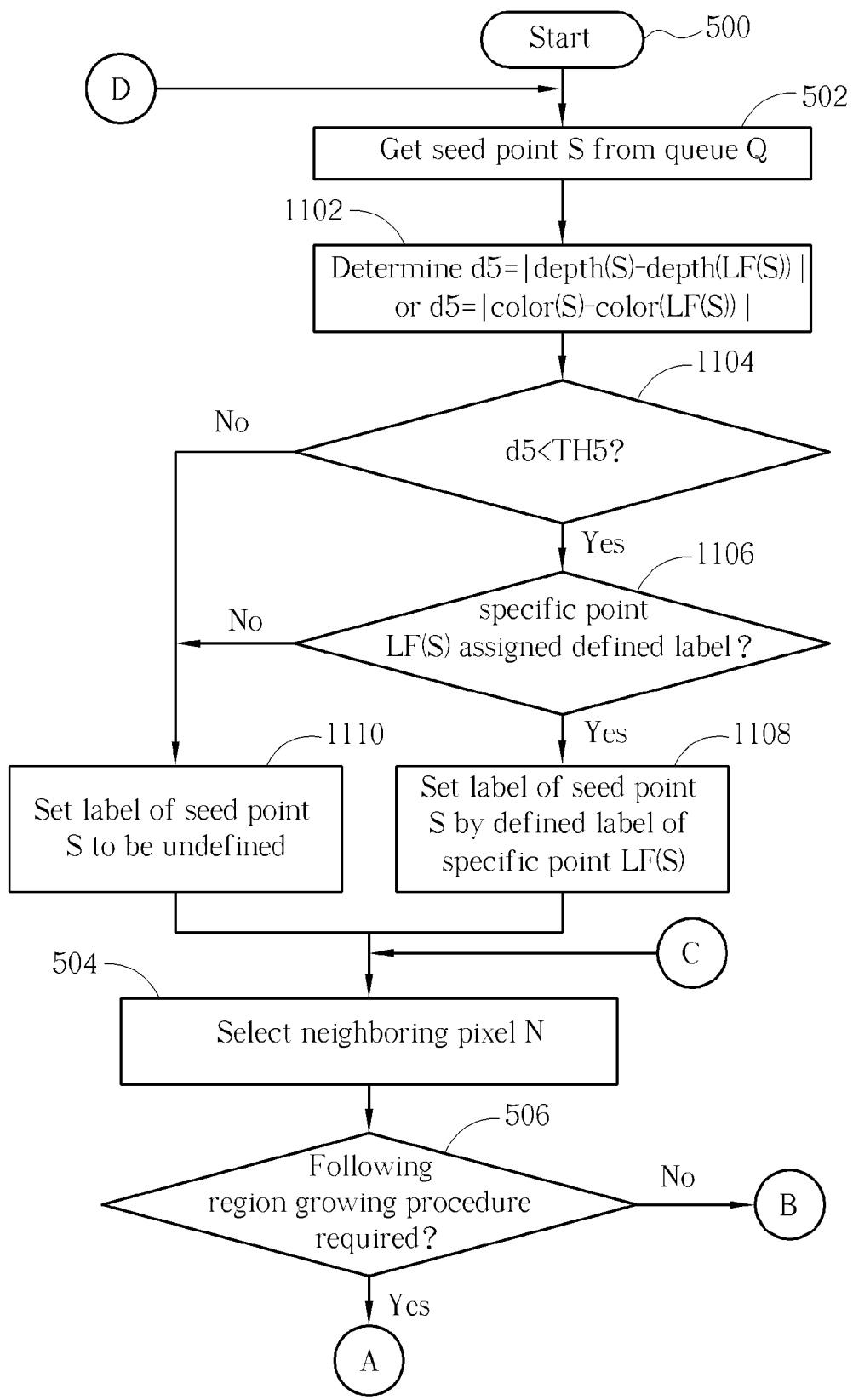
FIG. 11 is a flowchart illustrating a region growing method with labeling according to an embodiment of the present invention.
Figure 12:
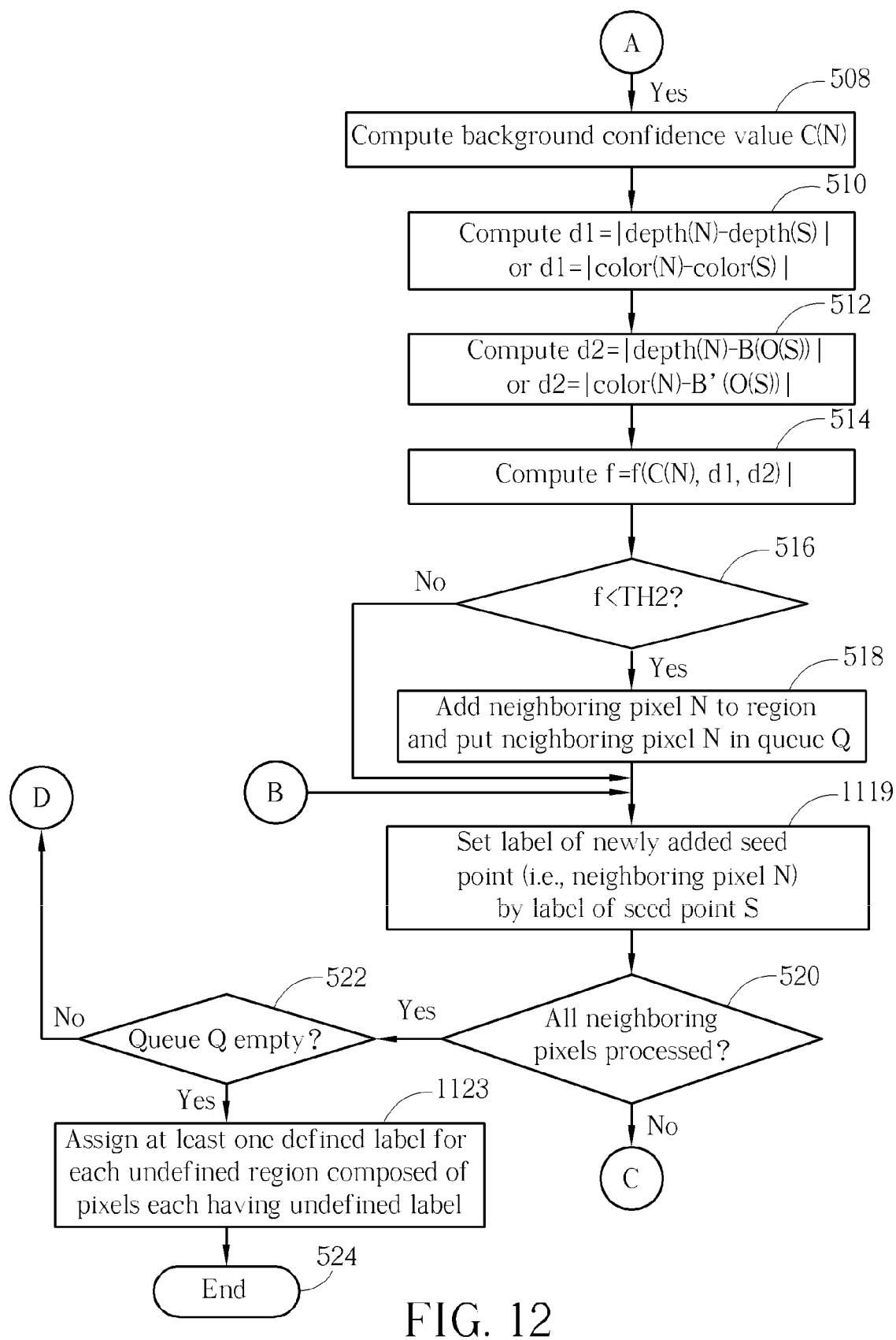
FIG. 12 shows a continued flow of FIG. 11.

Another common task is to label different objects segmented in a frame. This task may also be accomplished in the region growing stage with some modifications. In order to label objects identified in a current frame, the object labeling result from the previous frame should be maintained. Please refer to FIG. 11 and FIG. 12. FIG. 11 is a flowchart illustrating a region growing method with labeling according to an embodiment of the present invention. FIG. 12 shows a continued flow of FIG. 11. If the result is substantially the same, the steps are not required to be executed in the exact order shown in FIG. 11 and FIG. 12. The exemplary region growing method shown in FIG. 11 and FIG. 12 is based on the exemplary region growing method shown in FIG. 5, and includes additional steps as below.

Step 1102: Determine a difference value d5 between a characteristic value of the seed point S in the current frame and a characteristic value of a specific point LF(S) in a previous frame, where the seed point S and the specific point LF(S) are co-located pixels. For example, the characteristic value may be a depth value when the region growing is applied to a depth map, or the characteristic value may be a color value when the region growing is applied to a color image (e.g., an RGB image). Hence, d5=|depth(S)−depth(LF(S))|, or d5=|color(S)−color(LF(S))|.

Step 1104: Check if the difference value d5 is smaller than a predetermined threshold TH5 by comparing the difference value d5 with the predetermined threshold TH5. If yes, go to step 1106; otherwise, go to step 1110.

Step 1106: Check if the specific point LF(S) in the previous frame is assigned a defined label. If yes, go to step 1108; otherwise, go to step 1110.

Step 1108: Set the label of the seed point S by the defined label of the specific point LF(S). Go to step 504.

Step 1110: Set the label of the seed point S to be undefined.

Step 1119: Set the label of the newly added seed point (i.e., the neighboring pixel N) by the label of the seed point S.

Step 1123: Assign at least one defined label for each undefined region composed of pixels each having an undefined label.

In this embodiment, regions with the same label, either a defined label or an undefined label, may be merged; a region with a defined label may be merged with a region with an undefined label; and regions with different defined labels cannot be merged. Based on such merging rules, the operation of step 1123 may be summarized as below.

When the undefined region does not connect any other regions, the undefined region is assigned a new defined label; when the undefined region connects only one defined region, the undefined region is assigned a defined label of the defined region; and when the undefined region connects more than one defined region, the undefined region is split into different sub-regions, and each sub-region is assigned a defined label of a defined region closest to the sub-region. In this way, the same object appearing in different frames will be given the same label for object identification purpose.

To put it simply, the above algorithm handles labeling and region growing at the same time. In step 1102, regions used to compare the depth value between current frame and previous frame may be defined by the object positions from the previous frame, and the regions may be shrank to reduce possible errors caused by movement.

It should be noted that adding the steps 1102-1110, 1119 and 1123 to the region growing method shown in FIG. 5 is merely one possible implementation of the present invention. In one alternative design, the steps 1102-1110, 1119 and 1123 may be added to the modified region growing method having the steps 613 and 614 shown in FIG. 6. In another alternative design, the steps 1102-1110, 1119 and 1123 may be added to the modified region growing method having the steps 723, 724 and 725 shown in FIG. 7. In yet another alternative design, the steps 1102-1110, 1119 and 1123 may be added to the modified region growing method having the step 907 shown in FIG. 9. The same objective of handling object labeling and object growing at the same time is achieved.

Algorithms proposed in the present invention use several thresholds. These thresholds may be determined by experiments for a specific sensor beforehand. For example, a depth sensor may have different accuracy at different depth ranges. Experiments may be performed in different depth/color ranges to obtain thresholds. In an alternative design, these thresholds may be determined adaptively by considering factors such as statistical values (e.g., means or variances of depth/color values) around small regions.

Figure 10:
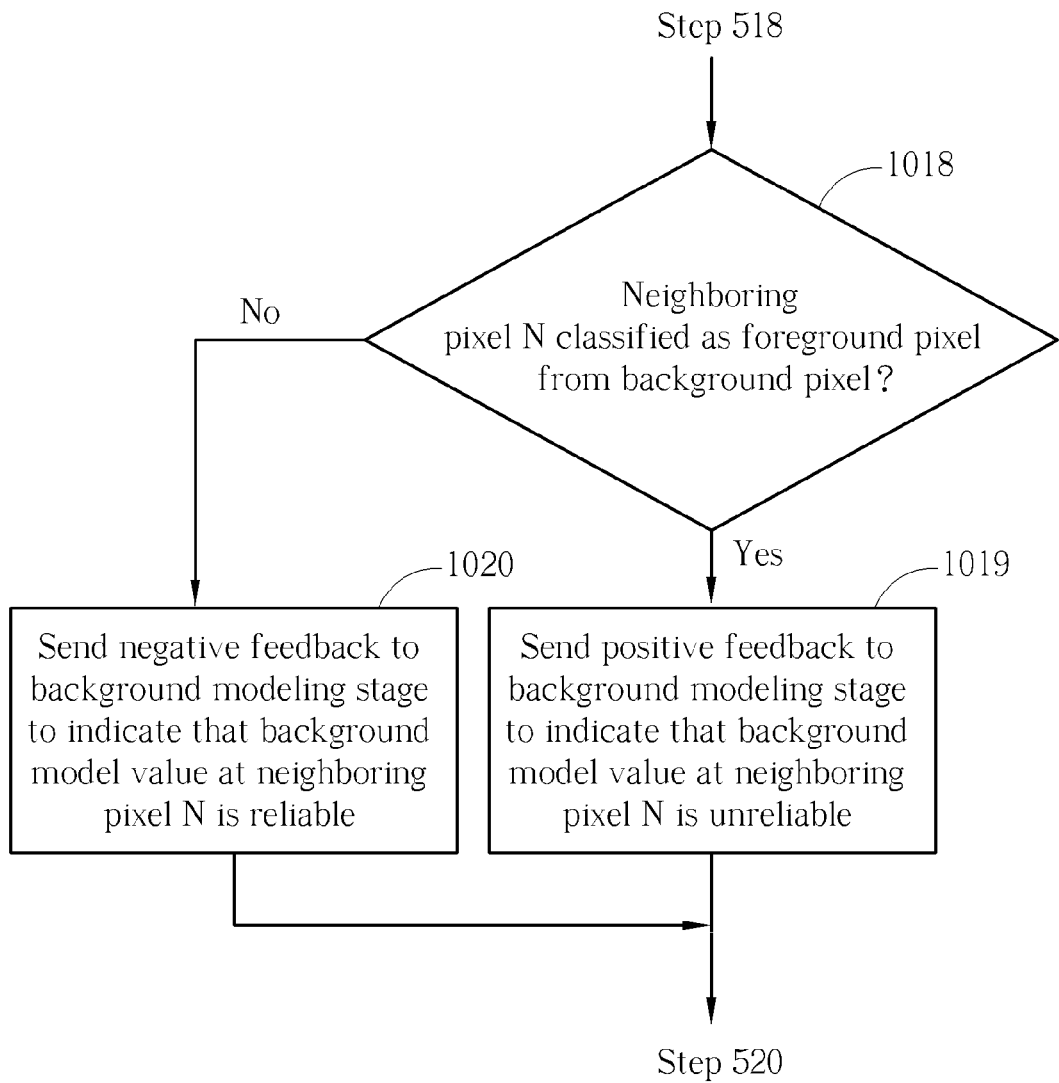
FIG. 10 is a flowchart illustrating the difference between another modified region growing method and the region growing method shown in FIG. 5 according to an embodiment of the present invention.

In summary, the proposed region growing algorithm may have the following features, depending upon the setting of the thresholds. In a case where the region growing method in FIG. 5/FIG. 6/FIG. 7/FIG. 10 is employed, when both a person and the floor are captured by a depth camera and the person keeps moving in a small area, sometimes, a small amount of unwanted region in the floor may be included. This happens at a very small chance. For the same situation above, the detected person may have some holes when the region growing method in FIG. 5 is employed. This is mainly due to tight thresholds, and this may happen at a higher frequency. In another case where the region growing method in FIG. 6/FIG. 7/FIG. 9/FIG. 10 is employed, if there are some errors in some frames (such as inclusion of unwanted region as mentioned above), these errors will also appear in following frames for some time. In yet another case where the region growing method in FIG. 10 is employed, when the background modeling algorithm receives the feedback from region growing algorithm, some background pixels that close to foreground pixels may become foreground pixels gradually in following frames, even if depth/color values at those pixels do not change.

Figure 13:
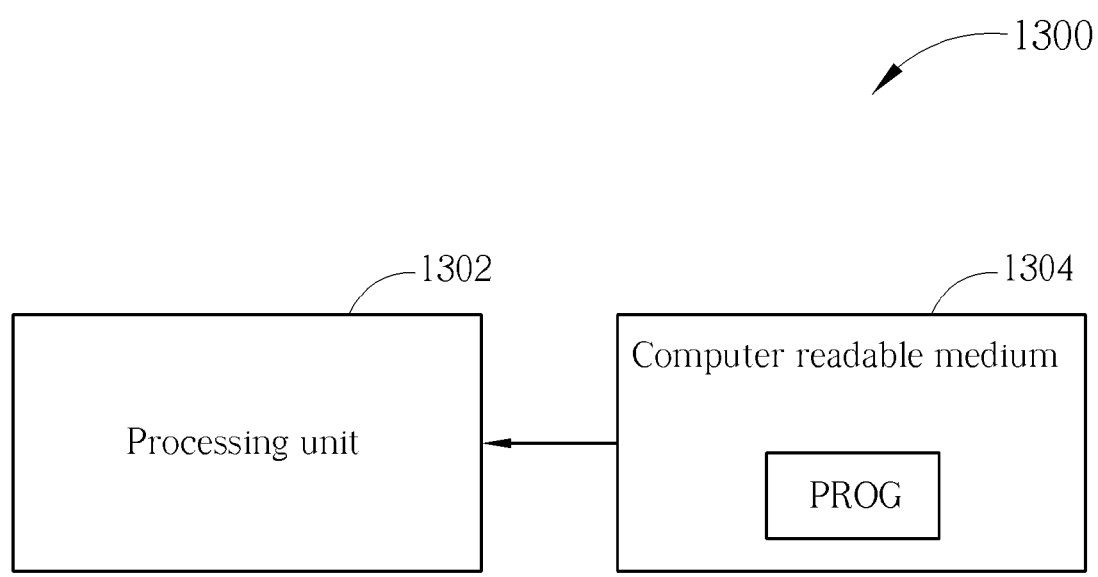
FIG. 13 is a block diagram illustrating an image processing apparatus according to an embodiment of the present invention.

Each of the proposed region growing methods may be performed by an image processing apparatus. Please refer to FIG. 13, which is a block diagram illustrating an image processing apparatus according to an embodiment of the present invention. By way of example, but not limitation, the image processing apparatus 1300 includes a processing unit 1302 and a computer readable medium 1304. For example, the processing unit 1302 may be a processor, such as a central processing unit (CPU) or a micro control unit (MCU), and the computer readable medium 1304 may be a memory device such as a volatile memory or a non-volatile memory. A program code PROG is stored in the computer readable medium 1304, and enables the processing unit 1302 to perform the proposed region growing method when executed by the processing unit 1302. As a person skilled in the art should readily understand operation of the image processing apparatus 1300 after reading above paragraphs directed to the proposed region growing methods, further description is omitted here for brevity. The image processing apparatus 1300 is implemented using a software-based architecture. However, this is for illustrative purposes only, and is not meant to be a limitation of the present invention. That is, using pure hardware to implement an image processing apparatus used for performing the proposed region growing algorithm is also feasible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A region growing method, comprising:
    selecting a seed point of a current frame as an initial growing point of a region in the current frame;
    referring to a planar surface detection result to check if a neighboring pixel belongs to a detected planar surface, and accordingly generating a checking result, wherein the neighboring pixel is blocked from being included in the region when the checking result indicates that the neighboring pixel belongs to the detected planar surface;
    determining a background confidence value at the neighboring pixel around the seed point, wherein the neighboring pixel is not a seed point of the region when determining the background confidence value is executed, when the background confidence value is determined to be a first value, it indicates that the neighboring pixel is more likely to be one background pixel, and when the background confidence value is determined to be a second value lower than the first value, it indicates that the neighboring pixel is less likely to be one background pixel; and
    utilizing a processing unit for checking if the neighboring pixel is allowed to be included in the region according to at least the background confidence value.

2. The region growing method of claim 1, further comprising:
determining a difference value between a characteristic value of the seed point and a characteristic value of the neighboring pixel;
wherein the checking step comprises:
checking if the neighboring pixel is allowed to be included in the region according to at least the background confidence value and the difference value.

3. The region growing method of claim 1, further comprising:
determining a difference value between a characteristic value of the neighboring pixel and a background model value of an original seed point associated with the seed point, wherein the original seed point is determined at the beginning of applying the region growing method to the current frame;
wherein the checking step comprises:
checking if the neighboring pixel is allowed to be included in the region according to at least the background confidence value and the difference value.

4. The region growing method of claim 1, further comprising:
when a specific pixel in a previous frame is a foreground pixel, determining a difference value between a characteristic value of the neighboring pixel in the current frame and a characteristic value of the specific pixel in the previous frame, wherein the neighboring pixel and the specific pixel are co-located pixels;
wherein the checking step comprises:
checking if the neighboring pixel is allowed to be included in the region according to at least the background confidence value and the difference value.

5. The region growing method of claim 1, further comprising:
when the neighboring pixel in the current frame is classified as a background pixel in response to the checking step and a specific pixel in a previous frame is classified as a foreground pixel, determining a difference value between a characteristic value of the neighboring pixel and a characteristic value of the specific pixel, wherein the neighboring pixel and the specific pixel are co-located pixels, wherein the neighboring pixel is classified as the background pixel when the neighboring pixel is not allowed to be included in the region; and
selectively reclassifying the neighboring pixel as a foreground pixel according to the difference value.

6. The region growing method of claim 1, further comprising:
when the neighboring pixel is initially classified as a background pixel by a background model but classified as a foreground pixel in response to the checking step, sending a feedback to indicate that a background model value at the neighboring pixel is unreliable, wherein the neighboring pixel is classified as the foreground pixel when the neighboring pixel is allowed to be included in the region.

7. A region growing method, comprising:
selecting a seed point of a current frame as an initial growing point of a region in the current frame;
determining a first difference value between a characteristic value of the seed point and a characteristic value of a neighboring pixel around the seed point in the current frame;
determining a second difference value between the characteristic value of the neighboring pixel and a background model value of an original seed point associated with the seed point, wherein the original seed point is determined at the beginning of applying the region growing method to the current frame, the background model value is derived from a background model, and the characteristic value of the neighboring pixel is not derived from the background model; and
utilizing a processing unit for checking if the neighboring pixel is allowed to be included in the region according to at least the first difference value and the second difference value.

8. The region growing method of claim 7, further comprising:
when a specific pixel in a previous frame is a foreground pixel, determining a third difference value between the characteristic value of the neighboring pixel in the current frame and a characteristic value of the specific pixel in the previous frame, wherein the neighboring pixel and the specific pixel are co-located pixels;
wherein the checking step comprises:
checking if the neighboring pixel is allowed to be included in the region according to at least the first difference value, the second difference value, and the third difference value.

9. The region growing method of claim 7, further comprising:
when the neighboring pixel in the current frame is classified as a background pixel in response to the checking step and a specific pixel in a previous frame is classified as a foreground pixel, determining a third difference value between the characteristic value of the neighboring pixel and a characteristic value of the specific pixel, wherein the neighboring pixel and the specific pixel are co-located pixels, and the neighboring pixel is classified as the background pixel when the neighboring pixel is not allowed to be included in the region; and
selectively reclassifying the neighboring pixel as a foreground pixel according to the third difference value.

10. The region growing method of claim 7, further comprising:
when the neighboring pixel is initially classified as a background pixel by the background model but classified as a foreground pixel in response to the checking step, sending a feedback to indicate that a background model value at the neighboring pixel is unreliable, wherein the neighboring pixel is classified as the foreground pixel when the neighboring pixel is allowed to be included in the region.

11. The region growing method of claim 7, further comprising:
referring to a planar surface detection result to check if the neighboring pixel belongs to a detected planar surface, and accordingly generating a checking result;
wherein the neighboring pixel is blocked from being included in the region when the checking result indicates that the neighboring pixel belongs to the detected planar surface.

12. A region growing method, comprising:
selecting a seed point of a current frame as an initial growing point of a region in the current frame;
determining a first difference value between a characteristic value of a neighboring pixel around the seed point in the current frame and a background model value of an original seed point associated with the seed point, wherein the original seed point is determined at the beginning of applying the region growing method to the current frame, the background model value is derived from a background model, and the characteristic value of the neighboring pixel is not derived from the background model; and utilizing a processing unit for checking if the neighboring pixel is allowed to be included in the region according to at least the first difference value.

13. The region growing method of claim 12, further comprising:

when a specific pixel in a previous frame is a foreground pixel, determining a second difference value between a characteristic value of the neighboring pixel in the current frame and a characteristic value of the specific pixel in the previous frame, wherein the neighboring pixel and the specific pixel are co-located pixels;

wherein the checking step comprises:

checking if the neighboring pixel is allowed to be included in the region according to at least the first difference value and the second difference value.

14. The region growing method of claim 12, further comprising:

when the neighboring pixel in the current frame is classified as a background pixel in response to the checking step and a specific pixel in a previous frame is classified as a foreground pixel, determining a second difference value between a characteristic value of the neighboring pixel and a characteristic value of the specific pixel, wherein the neighboring pixel and the specific pixel are co-located pixels, and the neighboring pixel is classified as the background pixel when the neighboring pixel is not allowed to be included in the region; and selectively reclassifying the neighboring pixel as a foreground pixel according to the second difference value.

15. The region growing method of claim 12, further comprising:

when the neighboring pixel is initially classified as a background pixel by a background model but classified as a foreground pixel in response to the checking step, sending a feedback to indicate that a background model value at the neighboring pixel is unreliable, wherein the neighboring pixel is classified as the foreground pixel when the neighboring pixel is allowed to be included in the region.

16. The region growing method of claim 12, further comprising:

referring to a planar surface detection result to check if the neighboring pixel belongs to a detected planar surface, and accordingly generating a checking result;

wherein the neighboring pixel is blocked from being included in the region when the checking result indicates that the neighboring pixel belongs to the detected planar surface.

17. A region growing method, comprising:

selecting a seed point of a current frame as an initial growing point of a region;

when a specific pixel in a previous frame is classified as a foreground pixel, determining a difference value between a characteristic value of a neighboring pixel around the seed point in the current frame and a characteristic value of the specific pixel in the previous frame, wherein the neighboring pixel and the specific pixel are co-located pixels, and when the specific pixel in the previous frame is not classified as the foreground pixel, determining the difference value is not executed;

utilizing a processing unit for checking if the neighboring pixel is allowed to be included in the region of the current frame according to at least the difference value.

18. A region growing method, comprising:

selecting a seed point of a current frame as an initial growing point of a region;

checking if a neighboring pixel around the seed point in the current frame is allowed to be included in the region;

when the neighboring pixel in the current frame is classified as a background pixel in response to the checking step and a specific pixel in a previous frame is classified as a foreground pixel, determining a difference value between a characteristic value of the neighboring pixel and a characteristic value of the specific pixel, wherein the neighboring pixel and the specific pixel are co-located pixels, and when the neighboring pixel in the current frame is classified as the background pixel in response to the checking step and the specific pixel in the previous frame is not classified as the foreground pixel, determining the difference value is not executed; and utilizing a processing unit for selectively reclassifying the neighboring pixel as a foreground pixel according to the difference value.

19. A region growing method, comprising:

selecting a seed point of a current frame as an initial growing point of a region;

utilizing a processing unit for referring to a planar surface detection result to check if a neighboring pixel belongs to a detected planar surface, and accordingly generating a checking result, wherein the neighboring pixel is around the seed point in the current frame;

when the checking result indicates that the neighboring pixel belongs to the detected planar surface, blocking the neighboring pixel from being included in the region; and when the checking result indicates that the neighboring pixel does not belong to the detected planar surface, checking if the neighboring pixel is allowed to be included in the region.

20. A region growing method, comprising:

selecting a seed point of a current frame as an initial growing point of a region in the current frame;

determining a first difference value between a characteristic value of the seed point and a characteristic value of a neighboring pixel around the seed point in the current frame;

utilizing a processing unit for checking if the neighboring pixel is allowed to be included in the region according to at least the first difference value;

when the neighboring pixel is initially classified as a background pixel by a background model but classified as a foreground pixel by a region growing stage, sending a feedback to indicate that a background model value at the neighboring pixel is unreliable, wherein the neighboring pixel is classified as the foreground pixel when the neighboring pixel is allowed to be included in the region;

when the feedback indicates that the background model value at the neighboring pixel is unreliable, checking if adjusting the background model value at the neighboring pixel is allowable;

when adjusting the background model value at the neighboring pixel is allowable, adjusting the background model value at the neighboring pixel, and labeling the adjusted background model value at the neighboring pixel as reliable; and when adjusting the background model value at the neighboring pixel is not allowable, keeping the background model value at the neighboring pixel unchanged, wherein the background model value at the neighboring pixel remains labeled as unreliable.

21. A region growing method, comprising:

selecting a seed point of a current frame as an initial growing point of a region in the current frame;

referring to a planar surface detection result to check if a neighboring pixel belongs to a detected planar surface, and accordingly generating a checking result;

determining a first difference value between a characteristic value of the seed point and a characteristic value of the neighboring pixel around the seed point in the current frame; and utilizing a processing unit for checking if the neighboring pixel is allowed to be included in the region according to at least the first difference value, wherein the neighboring pixel is blocked from being included in the region when the checking result indicates that the neighboring pixel belongs to the detected planar surface.

22. A region growing method, comprising:

selecting a seed point of a current frame as an initial growing point of a region in the current frame;

referring to a planar surface detection result to check if a neighboring pixel belongs to a detected planar surface, and accordingly generating a checking result;

determining a first difference value between a characteristic value of the neighboring pixel around the seed point in the current frame and a background model value of an original seed point associated with the seed point, wherein the original seed point is determined at the beginning of applying the region growing method to the current frame, and the background model value is derived from a background model; and utilizing a processing unit for checking if the neighboring pixel is allowed to be included in the region according to at least the first difference value, wherein the neighboring pixel is blocked from being included in the region when the checking result indicates that the neighboring pixel belongs to the detected planar surface.

* * * * *